Patented Apr. 14, 1942

2,279,745

UNITED STATES PATENT OFFICE 2,279,745

POLYAMIDES

Halsey B. Stevenson, Wilmington, Del., assignor to E. I. du Pont de Nemours & Company, Wilmington, Del., a corporation of Delaware No Drawing. Application October 18, 1939, Serial No. 300,086

7 Claims. (Cl. 260—78)

This invention relates to polyamides and more particularly to fiber-forming linear polyamides.

The polyamides with which this invention is concerned are of the general type described in U. S. Patents 2,071,253 and 2,130,948. A characteristic property of these polymers is that they can be cold-drawn into fibers showing by characteristic X-ray patterns orientation along the fiber-axis. On hydrolysis with mineral acids, the polyamides revert to monomeric amide-forming reactants. For example, a polyamide derived from a diamine and a dibasic acid yields on hydrolysis with hydrochloric acid the dibasic acid and the diamine hydrochloride.

In order to modify the properties of the polyamides it has been proposed to use polyamide-forming reactants containing an hydroxyl group as a lateral substituent on the chain of atoms separating the amide-forming groups, e. g., amino or carboxyl groups. The products previously obtained, however, have been resinous rather than crystalline in character and not suited, or at best poorly suited, to the production of fibers.

This invention has as an object the preparation of new and useful polymeric products. A further object is the production of improved polymers useful in the textile and in other arts. A still further object is the preparation of fiber-forming polyamides having a lateral substituent by means of which the properties of the polyamide can be altered through chemical reactions. Other objects will appear hereinafter.

These objects are accomplished by heating to reaction temperature, generally from 100 to 300° C., a polyamide-forming composition comprising at least one reactant which contains a lateral substituent which is or contains a hydroxyl group, the hydroxyl group being removed by at least five atoms from any carboxyl group and by at least three atoms from any amino group, and continuing the reaction until a fiber-forming product is obtained.

I have discovered when the lateral substituent is an hydroxyl group and when in addition this group is separated from the amide-forming groups as pointed out above, that the products, instead of being non-fiber-forming resinous products, or of too low molecular weight to be valuable for the production of fibers, are on the other hand high molecular weight products having good fiber-forming properties and exhibiting, for the most part, definite crystallinity. By this means it is possible to obtain synthetic fibers having properties not otherwise readily obtainable.

The term "polyamide-forming composition" designates any composition which provides molecules having amino groups and amide-forming groups complementary thereto and which yields a polyamide on heating. It includes amino acids and their amide-forming derivatives. It also includes mixtures of diamines and dibasic carboxylic acids or their amide-forming derivatives. By "amide-forming derivative of an acid" is meant an ester, acid halide, amide, anydride, or nitrile. When the polymers are obtained from amino acids the separate molecules of the acid, which provide the complementary amino and carboxyl groups, constitute the polyamide-forming reactants.

An example of an amino acid containing a lateral substitutent comprising an hydroxyl group separated at least three atoms from the amino group and at least five atoms from the carboxyl group is β-(p-hydroxyphenyl)-ε-aminocaproic acid having the formula

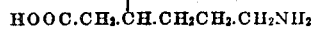
HOOC.CH₂.CH.CH₂CH₂.CH₂NH₂ where the hydroxyl group is separated from the carboxyl group by six atoms and from the amino group by eight atoms.

When the polyamide is obtained by reacting a diamine with a dicarboxylic acid, an example of a suitable acid is β-(p-hydroxyphenyl) adipic acid having the formula

HOOC.CH₂CH.CH₂CH₂COOH

Similarly the lateral substituent comprising an hydroxyl group may be contained by the diamine, as for instance 4-hydroxyheptamethylenediamine of the formula

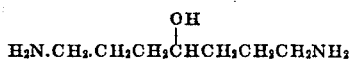

in which case the dicarboxylic acid may or may not contain a hydroxyl lateral substituent.

The present polyamides may be obtained by heating the polyamide-forming composition to reaction temperature (generally 100–300° C. and preferably 150–280° C.) in an open or closed reactor under ordinary, reduced or increased pressure, preferably in the absence of oxygen, until a polymer of the desired properties is formed. Reaction may also be carried out in the presence of a solvent, or in the presence of a diluent which is a nonsolvent for the polymer, or a mixture of solvent and diluent. The reaction generally involves the removal of a byproduct, e. g., water, alcohol, phenol, hydrogen chloride, or ammonia, depending upon the amide-forming derivative of the acid used.

In the resulting polyamides the lateral substituent which is or contains a hydroxyl group is attached to the divalent, organic radicals separating recurring amide groups in the polymer chain. The position of the hydroxyl group and the order and frequency of its occurrence in the polymer chain are dependent upon the reactants used in the preparation of the polymer. If the polyamide is obtained exclusively from a polymerizable monoamino-monocarboxylic acid $$NH_2RCOOH$$

in which R is a divalent organic radical containing a lateral substituent which is or contains an hydroxyl group, then this lateral group will be present in each recurring unit (—NHRCO—) in the polyamide. If the polymer is derived from a mixture of polymerizable amino acids only one of which contains a lateral substituent, which is or contains an hydroxyl group, the said hydroxyl group will, of course, appear less frequently in the polymer molecule. It is evident that several types of polyamides of the diamine-dibasic acid type containing lateral substituents which are or contain hydroxyl groups can be prepared; for example, those in which the diamine

represented contains a lateral substituent which is or contains an hydroxyl group, those in which the dibasic acid (HOOCR''COOH) contains a lateral substituent which is or contains an hydroxyl group and those in which both the amine and acid contain a lateral substituent which is or contains an hydroxyl group. In the formulae, R' and R'' represent divalent organic radicals containing a lateral substituent which is or contains an hydroxyl group. Still further combinations are possible by using diamines and dibasic acids free from hydroxyl groups as lateral substituents along with diamines and/or dibasic acids containing lateral substituents which are or contain hydroxyl groups. It is also possible to use polymerizable amino acids in conjunction with a diamine and a dibasic acid, providing at least one of said reactants contains a lateral substituent which is or contains an hydroxyl group. It is evident therefore that at least one of the reactants used in the preparation of the products of this invention has the formula XR'''Y, in which X and Y represent amide-forming groups, e. g., amino or carboxyl groups, and R''' represents a divalent organic radical containing a lateral substituent which is or contains an hydroxyl group. On hydrolysis with strong mineral acid, the polymers generally yield the reactants from which they were derived, the amino constituents being obtained in the form of their mineral acid salts.

The following examples, in which parts are given by weight, illustrate the preparation of typical products of this invention.

Example I

Methyl 6-ketohendecanedioate was prepared from ε-carbomethoxyvaleryl chloride by the method disclosed in the application of J. C. Sauer, Serial No. 234,843, filed October 13, 1938. Hydrogenation over Raney nickel and saponification gave 6-hydroxyhendecanedioic acid $$(HO_2C(CH_2)_4CHOH(CH_2)_4CO_2H)$$

melting point 94–96° C. Neutral equivalent Calc'd: 116. Found: 118.1.

Alcohol solutions containing equivalent quantities of 6-hydroxyhendecanedioic acid $$(HO_2C(CH_2)_4CHOH(CH_2)_4CO_2H$$

and triglycoldiamine $$(NH_2CH_2CH_2OCH_2CH_2OCH_2CH_2NH_2)$$

were mixed to give a non-crystalline, oily salt. A portion of this salt was heated under nitrogen at 225° C. in a sealed tube for three hours, at 196° C. at atmospheric pressure for 3 hours, and at 196° C. at 5 mm. absolute pressure for 2 hours. The resulting polyamide was translucent, hard, and tough. It had a melting point of 156° C. and an intrinsic viscosity of .77, as defined in U. S. Patent 2,130,948. It could be easily spun into filaments which could be cold-drawn into oriented fibers. The polymer was soluble in water and could be cast from aqueous solution into films which were strong and pliable.

Example II

The salt (I) of hexamethylenediamine and 6-hydroxyhendecanedioic acid was prepared by mixing equivalent quantities of the two materials in absolute ethanol. It melted at 172–172.2° C. A mixture of this salt and 2 mol per cent of hexamethylenediamine as viscosity stabilizer was heated under purified nitrogen in a sealed tube at 235° C. for 1.5 hours. The polymerization was completed by heating under nitrogen at atmospheric pressure at 218° C. for 3 hours. The polymer was tough and translucent and could be spun into long filaments which were easily cold-drawn to crimped fibers melting at 160–165° C. The intrinsic viscosity of the polymer was 1.05.

Interpolyamides, that is polyamides obtained by including other polyamide-forming reactants with the above defined reactants containing the lateral substituent, are particularly valuable for the purposes of the present invention. The preparation of polyamides of this kind was described in the following examples.

Example III

Interpolyamides were prepared from mixtures of the specified amount by weight of the salt (II) of hexamethylenediamine and adipic acid with the salt (I) of hexamethylenediamine and 6-hydroxyhendecanedioic acid, following the general procedure described in Example II. The properties of various representative polyamides and interpolyamides are shown in the following table.

Polyamides derived from 6-hydroxyhendecane-dioic acid

| | Ingredients, percent by weight of— | | Stabilizer, mol percent | Heating schedule | | | | Melting point | Intrinsic viscosity | Remarks (strength based on original dimensions) |
|---|---|---|---|---|---|---|---|---|---|---|
| | Salt I | Salt II | | Sealed | | Open | | | | |
| | | | | Hrs. | Temp. | Hrs. | Temp. | | | |
| | | | | | °C. | | °C. | °C. | | |
| 1 | 100 | | | 1 | 250 | .5 | 200 | 153–156 | 1.24 | Film 3,300 lbs./sq. in., elongation 50%. |
| 2 | 100 | | 5 | 1.5 | 245 | 2 | 218 | 161–162 | .70 | |
| 3 | 75 | 25 | | 1.5 | 210 | 1 | 260 | 138–140 | 1.51 | Film 2,900 lbs./sq. in., elongation 120%. |
| 4 | 50 | 50 | | 1.5 | 230 | 1 | 260 | 180–185 | 1.20 | Film 5,670 lbs./sq. in., elongation 35%. |
| 5 | 25 | 75 | | 1.5 | 230 | 1 | 280 | 208–210 | 1.07 | |
| 6 | 10 | 90 | 1.6 | 1.5 | 235 | 2.5 | 280 | 238–240 | .86 | |
| 7 | .5 | 95 | 1.6 | 1.5 | 235 | 2.5 | 280 | 242–245 | .86 | Fibers 4.33 g./denier. |

EXAMPLE IV

Nitration of β-phenyladipic acid gave β-(p-nitrophenyl)adipic acid, M. P. 166–168° C., which was hydrogenated in the presence of platinum to β-(p-aminophenyl)adipic acid, M. P. 179–180° C. Anal. Calc'd. for $C_{12}H_{15}O_4N$: N, 5.91. Found: N, 5.86. This was converted by diazotization to β-(p-hydroxylphenyl)adipic acid, M. P. 147–148.5° C. Anal. Calc'd. for $C_{12}H_{14}O_5$: C, 60.48; H, 5.88. Found: C, 60.03; H, 5.75. The salt (III) of hexamethylenediamine and β-(p-hydroxyphenyl)adipic acid, M. P. 212–214° C., was prepared by mixing alcoholic solutions of equivalent quantities of the two materials. An interpolyamide was prepared from a mixture containing 10% of salt III and 90% of salt II with 1.25 mol per cent of acetic acid as viscosity stabilizer by heating at 250° C. for 2 hours in a sealed tube under nitrogen and at 268° C. for 2 hours at atmospheric pressure. The interpolyamide was very hard and tough. It could be spun into long filaments which were easily cold-drawn.

The reaction of the above examples can also be carried out in the presence of an inert solvent of which monohydric phenols, e. g., phenol, cresols, xylenols, and hydroxydiphenyls, are especially useful. Inert nonsolvents such as hydrocarbons, e. g., white medicinal oil, may be used. When easily volatile reactants are employed, it is desirable to carry out at least the initial stage of the reaction in a closed vessel or under reflux to prevent loss of reactants. The products of this invention are conveniently prepared in an open reactor equipped with a reflux condenser which permits the water or other by-products of the reaction to escape, but not the reactants or solvent. During the latter stages of the reaction, it is often desirable to decrease the pressure in order to complete the reaction and, if desired, to distill off the solvent. However, the products can be removed from the solvent by precipitation methods.

Further examples of dibasic acids containing a lateral substituent which is an hydroxyl group and which produces fiber-forming polyamides are 6-(p-hydroxyphenyl)-hendecanedioic acid, 6,6 - bis(p - hydroxyphenyl)hendecanedioic acid, 6 - (4' - hydroxynapthyl)hendecanedioic acid, 6,6 - bis(4' - hydroxynaphthyl)hendecanedioic acid, 4-(4'-hydroxynaphthyl)pimelic acid, 4,4-bis(4' - hydroxynaphthyl)pimelic acid, phenol-2,4-dibutyric acid, phenol-2,4-dicaproic acid, β-(4-hydroxycyclohexyl)adipic acid, and their amide-forming derivatives. These dibasic acids or their amide-forming derivatives may be reacted with diamines such as tetramethylenediamine, pentamethylenediamine, hexamethylenediamine, octamethylenediamine, decamethylenediamine, 3-methyl-1,6-diaminohexane, 2,5-dimethyl-1,6-diaminohexane, m-phenylenediamine, tetraglycoldiamine, N - methylhexamethylenediamine, piperazine, and the diamines noted below.

Additional diamines containing a lateral substituent comprising an hydroxyl group are 3-(4' - hydroxyphenyl)hexamethylenediamine, 3-(4' - hydroxycyclohexyl)hexamethylenediamine, 6 - hydroxyhendecamethylenediamine, 5 - hydroxynonamethylenediamine, 4 - hydroxyoctamethylenediamine, 4 - hydroxyheptamethylenediamine, 2-(4'-hydroxyphenyl)-tetramethylenediamine, 3-(4'-hydroxyphenyl)-pentamethylenediamine, 3 - (hydroxymethyl)hexamethylenediamine, phenol-2,4-bis(6'-hexylamine), and phenol-2,4-bis(2'-ethylamine). These diamines may be reacted with dibasic acids such as adipic, pimelic, suberic, azelaic, sebacic, isophthalic, diphenylolpropanediacetic, β-phenyladipic, and $\alpha,\alpha'$-dimethyladipic or their amide-forming derivatives.

Other amino acids containing a lateral substituent which is or contains an hydroxyl group which would produce fiber-forming polyamides are β-(4-hydroxyphenyl)-ε-amino-caproic acid, 11-amino-6-hydroxyhendecanoic acid, β-(4-hydroxycyclohexyl)-ε-aminocaproic acids and their amide-forming derivatives. These amino acids or their amide-forming derivatives may be reacted with other amino acids such as ε-aminocaproic acid, ω-aminocapric acid, ω-aminoundecanoic acid or their amide-forming derivatives.

The new polyamides described herein possess several valuable advantages over other fiber-forming polyamides because of the fact that the hydroxyl group confers new and useful properties to the polymer. Thus the hydroxyl group, because of its pronounced hydrophilic character increases the water-sensitivity of the polymer. This facilitates the pressing of fabrics made therefrom. If the polymer is derived from ingredients containing other hydrophilic groups, as illustrated in Example I, the water-solubility of the polymer is enhanced. Fibers made from water-soluble polyamides can be used to advantage as backings in making lace.

The hydroxyl group offers a point of attack on the polyamide molecule for other reagents which can impart new and useful properties to the polyamide, particularly in the form of films or fibers. Treatment of a fiber-forming polyamide containing a lateral substituent which is or contains an hydroxyl group with a reagent such as a diisocyanate or a dimethylolurea dialkyl ether, followed by a short period of heating, decreases the solubility of the polyamide, alters its cold-drawing properties, and improves the stiffness and tenacity of the material. If the hydroxyl-containing polyamide is treated with a long-chain acylethenone, the water-resistance of the resulting polymer is greatly increased. If the hydroxyl group is attached to an aromatic group, as illustrated in Example IV, it is possible to couple with this phenolic group various diazonium compounds so as to form colored derivatives combined integrally with the fibers. By suitable choice of diazonium compound, the desired color can be produced within the polyamide molecule. Thus the products of Example IV can be converted by treatment with benzenediazonium chloride into compounds possessing a fast yellow-brown color, without change in the other properties of the polymers.

The polymers of this invention may be admixed with other substances, e. g. pigments, dyes, resins, cellulose derivatives, oils, other polyamides, etc.

As many apparently widely different embodiments of this invention may be made without departing from the spirit and scope thereof, it is to be understood that I do not limit myself to the specific embodiments thereof except as defined in the appended claims.

I claim:

1. A polyamide capable of being formed into fibers showing by characteristic X-ray patterns orientation along the fiber axis, said polyamide comprising the reaction product of a polyamide-forming composition providing reactants having amino groups and carbonamide-forming groups complementary thereto, the amide-forming groups in at least one reactant being separated by a chain of atoms to which is attached a lateral substituent comprising an hydroxyl group attached to a carbon atom, said hydroxyl group being selected from the class consisting of alcoholic and phenolic hydroxyl groups and being removed from each amino group in said reactant by at least three atoms and from each amide-forming group complementary to said amino group by at least five atoms, said reactants containing only two amide-forming groups and being free from functional groups other than said amide-forming groups and said hydroxyl group.

2. A polyamide capable of being formed into fibers showing by characteristic X-ray examination orientation along the fiber axis, said polyamide comprising the reaction product of a diamine of the formula $NH_2RNH_2$ and a compound of the class consisting of dibasic acids of the formula $HOOCR'COOH$ and their amide-forming derivatives, R and R' being divalent organic radicals and R having a chain of atoms to one of which is attached a lateral substituent comprising an hydroxyl group attached to a carbon atom, said hydroxyl group being selected from the class consisting of alcoholic and phenolic hydroxyl groups and being removed from each amino group by at least three atoms, said divalent radicals being free from functional groups other than said hydroxyl group.

3. A polyamide capable of being formed into fibers showing by characteristic X-ray examination orientation along the fiber axis, said polyamide comprising the reaction product of a diamine of the formula $NH_2RNH_2$ and a compound of the class consisting of dibasic acids of the formula $HOOCR'COOH$ and their amide-forming derivatives, R and R' being divalent organic radicals and R' having a chain of atoms to one of which is attached a lateral substituent comprising an hydroxyl group attached to a carbon atom, said hydroxyl group being selected from the class consisting of alcoholic and phenolic hydroxyl groups and being removed from each carboxyl group by at least five atoms, said divalent radicals being free from functional groups other than said hydroxyl group.

4. A polyamide capable of being formed into fibers showing by characteristic X-ray examination orientation along the fiber axis, said polyamide being that obtained by heating a compound of the class consisting of polymerizable monoaminomonocarboxylic acids of the formula $NH_2RCOOH$ and amide-forming derivatives thereof, R being a divalent organic radical having a chain of atoms to one of which is attached a lateral substituent comprising an hydroxyl group attached to a carbon atom, said hydroxyl group being selected from the class consisting of alcoholic and phenolic hydroxyl groups and being removed from the amino group by at least three atoms and from the carboxyl group by at least five atoms, said divalent radical being free from functional groups other than said hydroxyl group.

5. A process which comprises heating at reaction temperature a diamine of the formula $NH_2RNH_2$ and a compound of the class consisting of dibasic acids of the formula $HOOCR'COOH$ and their amide-forming derivatives, R and R' being divalent organic radicals and R having a chain of atoms to one of which is attached a lateral substituent comprising an hydroxyl group attached to a carbon atom, said hydroxyl group being selected from the class consisting of alcoholic and phenolic hydroxyl groups and being removed from each amino group by at least three atoms, and continuing said heating until a polyamide is obtained which is capable of being formed into fibers showing by characteristic X-ray patterns orientation along the fiber axis, said divalent radicals being free from functional groups other than said hydroxyl group.

6. A process which comprises heating at reaction temperature a diamine of the formula $NH_2RNH_2$ and a compound of the class consisting of dibasic acids of the formula $HOOCR'COOH$ and their amide-forming derivatives, R and R' being divalent organic radicals and R' having a chain of atoms to one of which is attached a lateral substituent comprising an hydroxyl group attached to a carbon atom, said hydroxyl group being selected from the class consisting of alcoholic and phenolic hydroxyl groups and being removed from each carboxyl group by at least five atoms, and continuing said heating until a polyamide is obtained which is capable of being formed into fibers showing by characteristic X-ray patterns orientation along the fiber axis, said divalent radicals being free from functional groups other than said hydroxyl group.

7. A process which comprises heating at reaction temperature a compound of the class consisting of polymerizable monoaminomonocarboxylic acids of the formula $NH_2RCOOH$ and amide-forming derivatives thereof, R being a divalent organic radical having a chain of atoms to one of which is attached a lateral substituent comprising an hydroxyl group attached to a carbon atom, said hydroxyl group being selected from the class consisting of alcoholic and phenolic hydroxyl groups and being removed from the amine group by at least three atoms and from the carboxyl group by at least five atoms, and continuing said heating until a polyamide is obtained which is capable of being formed into fibers showing by characteristic X-ray patterns orientation along the fiber axis, said divalent radical being free from functional groups other than said hydroxyl group.

HALSEY B. STEVENSON.

CERTIFICATE OF CORRECTION.

Patent No. 2,279,745.　　　　　　　　　　　　　　　April 14, 1942.

HALSEY B. STEVENSON.

It is hereby certified that error appears in the printed specification of the above numbered patent requiring correction as follows: Page 2, second column, line 25, at the end of the formula insert a parenthesis; page 3, in the table, last column thereof, for "Film 5,670 lbs./sq. in., elongation 35%" read --Film 5,670 lbs./sq. in., elongation 350%--; same page, first column, line 70, for "hydroxynapthyl" read --hydroxynaphthyl--; page 4, second column, line 11, for "hydroxy" read --hydroxyl--; page 5, first column, line 7, claim 7, for "amine" read --amino--; and that the said Letters Patent should be read with this correction therein that the same may conform to the record of the case in the Patent Office.

Signed and sealed this 26th day of May, A. D. 1942.

Henry Van Arsdale,
Acting Commissioner of Patents.

(Seal)